(12) United States Patent
Okuwaki et al.

(10) Patent No.: US 10,954,985 B2
(45) Date of Patent: Mar. 23, 2021

(54) EXTERNAL SCREW MEMBER

(71) Applicant: TOPURA CO., LTD., Hadano (JP)

(72) Inventors: Takehiro Okuwaki, Hadano (JP);
Takeki Sawanishi, Hadano (JP);
Shigeto Mori, Hadano (JP); Mayumi Matsuno, Hadano (JP); Yoshie Sato, Hadano (JP)

(73) Assignee: TOPURA CO., LTD., Hadano (JP)

( * ) Notice: Subject to any disclaimer, the term of this patent is extended or adjusted under 35 U.S.C. 154(b) by 0 days.

(21) Appl. No.: 16/879,344

(22) Filed: May 20, 2020

(65) Prior Publication Data

US 2020/0370587 A1 Nov. 26, 2020

(30) Foreign Application Priority Data

May 21, 2019 (JP) .............................. JP2019-095418

(51) Int. Cl.
*F16B 35/04* (2006.01)
*F16B 25/00* (2006.01)
(Continued)

(52) U.S. Cl.
CPC .......... *F16B 25/0047* (2013.01); *F16B 25/10* (2013.01); *F16B 33/02* (2013.01); *F16B 35/041* (2013.01)

(58) Field of Classification Search
CPC .............. F16B 25/0042; F16B 25/0047; F16B 25/0052; F16B 25/0057; F16B 33/02
(Continued)

(56) References Cited

U.S. PATENT DOCUMENTS 2,355,486 A * 8/1944 Tinnerman .............. F16B 39/32
411/272
3,527,136 A * 9/1970 Wilson ................ F16B 25/0021
411/423
(Continued)

FOREIGN PATENT DOCUMENTS

DE 4206440 A1 10/1992
JP S52-154563 U 11/1977
(Continued)

OTHER PUBLICATIONS

Extended European Search Report dated Oct. 23, 2020 (corresponding to EP 20175189.8).

*Primary Examiner* — Gary W Estremsky
(74) *Attorney, Agent, or Firm* — Harness, Dickey & Pierce, P.L.C.

(57) ABSTRACT

An external screw member includes a head, a shank, a parallel threaded portion, a tapered threaded portion, a screw thread, a convex portion and a screw driving side end face of the convex portion. The convex portion protruding more radially outward than the crest of the screw thread is formed in at least one of the parallel threaded portion and the tapered threaded portion over the tapered threaded portion and the parallel threaded portion. The screw driving side end face of the convex portion is configured to form an inclined plane which gradually rises from a root position of the end face at the side of the crest of the screw thread toward a crest of the convex portion in a direction opposite to a screw driving direction of the screw thread to reach the crest of the convex portion.

10 Claims, 8 Drawing Sheets

(51) Int. Cl.
*F16B 25/10* (2006.01)
*F16B 33/02* (2006.01)

(58) Field of Classification Search
USPC .................................................. 411/411
See application file for complete search history.

(56) References Cited

U.S. PATENT DOCUMENTS

| | | | | |
|---|---|---|---|---|
| 4,637,767 A * | 1/1987 | Yaotani | ............... | B21H 3/027 |
| | | | | 411/386 |
| 5,141,376 A * | 8/1992 | Williams | ............ | F16B 25/0021 |
| | | | | 411/387.4 |
| 6,447,227 B1 * | 9/2002 | Crutchley | ............... | F16B 19/10 |
| | | | | 411/178 |
| 6,478,520 B1 * | 11/2002 | Sala | ................... | F16B 25/0021 |
| | | | | 411/311 |
| 7,780,388 B2 * | 8/2010 | Yamaki | ............... | F16B 25/0047 |
| | | | | 411/386 |
| 2002/0192051 A1 * | 12/2002 | LeVey | ................. | F16B 25/0047 |
| | | | | 411/411 |
| 2005/0158149 A1 * | 7/2005 | Panasik | .................... | B21H 3/06 |
| | | | | 411/411 |
| 2005/0265805 A1 | 12/2005 | Suzuki | | |
| 2010/0061824 A1 * | 3/2010 | Lin | ..................... | F16B 25/0052 |
| | | | | 411/387.5 |
| 2016/0138639 A1 * | 5/2016 | Fujimoto | ................ | F16B 39/30 |
| | | | | 411/386 |

FOREIGN PATENT DOCUMENTS

| | | |
|---|---|---|
| JP | S56-035530 U | 4/1981 |
| JP | 2000-035016 A | 2/2000 |
| JP | 2001-173627 | 6/2001 |
| JP | 3871483 B2 | 1/2007 |
| JP | 4520771 B2 | 8/2010 |
| JP | 3172754 U | 1/2012 |
| WO | 2007/025736 A2 | 3/2007 |
| WO | 2007/025736 A3 | 7/2007 |

* cited by examiner

– 1 –
EXTERNAL SCREW MEMBER

CROSS-REFERENCE TO RELATED APPLICATIONS

This application claims the benefit and priority of Japanese Patent Application No. 2019-095418, filed on May 21, 2019. The entire disclosure of the above application is incorporated herein by reference.

FIELD

The present disclosure relates to an external screw member which can be used as a self-tapping screw adapted to be screwed into and tightened to a prepared hole in which an internal or internal thread is not formed, while forming a screw thread, or which is also available as a bolt capable of being screwed into and tightened to an internal screw (nut, etc.) to which foreign matter such as a paint film, spatter is adhered, while removing the foreign matter.

BACKGROUND

Self-tapping screws do not require tapping in a prepared hole in advance and hence are widely used, but require that screw driving torque at the time of forming a prepared hole be as low as possible. As a self-tapping screw for which screw driving torque is made low, there has been known an external screw in which a contact area between a screw thread and a prepared hole is made small, as illustrated in Patent Literature 1, for example.

The external screw described in this Patent Literature 1 has a first zone screw thread portion at the side of a screw head portion, and a second zone screw thread portion at the side of a screw tip end portion, wherein a self-tapping threaded portion with a thread height increased from a leading end of a thread at a root to a trailing end thereof at a crest is formed in the second zone screw thread portion, so that the generation of cutting chips is suppressed by changing the height of the screw thread on the circumference of the threaded portion.

However, when the length of an internal screw is long, the number of screw threads to be formed increases, and hence, there has been a problem that in a space of the self-tapping threaded portion in the second zone screw thread portion, cutting chips are not discharged well, but accumulate in the internal screw, as a result of which a screw driving torque increases abruptly.

In addition, Patent Literature 2 discloses a self-tapping screw which includes a machining screw portion for machining an internal screw thread, and a standard screw portion having a standard screw thread, wherein a screw thread continuously extending from the machining screw portion to the standard screw portion, and the machining screw portion is formed with a plurality of machining screw threads whose outside diameters and effective diameters are larger than those of the standard screw thread. A plurality of escape screw threads, whose outside diameters and effective diameters are smaller than those of the standard screw thread, are formed on the circumference of the machining screw portion between a plurality of machining screw threads, and the machining screw threads and the escape screw threads are formed into a continuously changing cross sectional shape, so that the generation of cutting chips at the time of machining is reduced, and an increase in the operation torque (driving torque) at the time of machining by the machining screw portion is suppressed.

However, in this Patent Literature 2, the machining screw portion is configured to machine the internal screw by means of the machining screw threads of a constant or fixed outside diameter from a tip end side. With such a configuration, the existence of the escape screw threads serves to suppress the increase of an operation torque, but a driving torque will be rapidly applied to the self-tapping screw from an early stage of machining, and so, operability of the self-tapping screw is bad. In addition, cutting chips are prone to accumulate in the spaces or gaps of the escape screw threads, thus posing a problem that the driving torque is increased due to the accumulation of the chips, as in the case of Patent Literature 1. Moreover, because the machining screw threads and the escape screw threads are configured to continuously change, a tool shape of a screw forming mold is complicated, and further, the screw threads of the internal screw once formed may be caused to further deform by the plurality of machining screw threads, thus giving rise to a fear that the shape of the screw threads of the internal screw may become imperfect or insufficient. As a result, it is difficult to carry out stable tightening or fastening.

On the other hand, it is considered that the self-tapping screw as described in Patent Literature 1 or Patent Literature 2 is used for an internal screw (a nut, etc.) to which foreign matter such as a paint film, etc., has been adhered, wherein the self-tapping screw is screwed into the internal screw, while removing the foreign matter by means of the tapping portion.

However, in the case of the external screw described in Patent Literature 1, the spaces or gaps between the second zone screw threads of the self-tapping screw portion are narrow, so that foreign matter can not be discharged well, thus causing jamming or biting of the foreign matter.

In addition, in the case of the self-tapping screw described in Patent Literature 2, too, exfoliated foreign matter can not be discharged well, so that the escape screw threads are clogged and jammed.

On the other hand, as a bolt which can be screwed into an internal screw (a nut, etc.) with foreign matter such as a paint film or the like adhered thereto, while removing the foreign matter, there has been developed a bolt as described in Patent Literature 3, for example. This bolt is partially provided, on at least a pressure side flank of each screw thread thereof, with a convex portion which exfoliates the paint film at the side of the internal screw, and the bolt is configured to be capable of being screwed into the internal screw, while exfoliating the paint film by the convex portion.

However, this bolt is not a self-tapping screw which is screwed into a prepared hole, while forming an internal screw in the prepared hole, and when the bolt is used as a self-tapping screw as it is, a lot of cutting chips will be produced, and hence, a driving torque will also become large.

PATENT LITERATURE

Patent Literature 1: Japanese Patent No. 4,520,771
Patent Literature 2: Japanese Patent Application Laid-Open Publication No. 2000-35016
Patent Literature 3: Japanese Patent No. 3871483

SUMMARY

Technical Problem

The object of the present disclosure is to provide an external screw member which can be used as a self-tapping screw, or can also be used as a bolt adapted to be screwed into an internal screw, while removing foreign matter adhered thereto, wherein in cases where the external screw member is used as the self-tapping screw, it is possible not only to suppress an increase in driving torque, but also to reduce an amount of chips to be generated, whereas in cases where the external screw member is used for the internal screw with foreign matter adhered thereto, it is possible not only to remove the foreign matter in a reliable manner, but also to discharge it smoothly, thereby making it possible to prevent jamming or biting of the foreign matter.

Solution to Problem

An external screw member according to one aspect of the present disclosure includes a head, a shank, a parallel threaded portion, a tapered threaded portion, a screw thread, a convex portion and a screw driving side end face of the convex portion. The shank linearly extends from the head. The parallel threaded portion and the tapered threaded portion are formed in order from the head toward a tip end. The screw thread is continuously formed on the parallel threaded portion and the tapered threaded portion at the same pitch. The screw thread in the tapered threaded portion is configured in a form in which a thread height becomes gradually smaller. The convex portion is formed in at least one of the parallel threaded portion and the tapered threaded portion over the tapered threaded portion and the parallel threaded portion. The convex portion protrudes more radially outward than the crest of the screw thread. The screw driving side end face of the convex portion is configured to form an inclined plane which gradually rises from an end edge position of the end face at the side of the crest of the screw thread toward the crest of a convex portion in a direction opposite to a screw driving direction of said screw thread to reach the crest of the convex portion.

In cases where the external screw member is used as a self-tapping screw, the screw thread of the tapered threaded portion of the external screw member gradually bites into an inner periphery of a prepared hole, while being screwed into the prepared hole, thereby to form an internal screw, and the internal screw is further machined or worked into a final internal screw thread shape by the convex portion formed in a portion extending from the tapered threaded portion to the parallel threaded portion, so that the screw thread of the parallel threaded portion is engaged and tightened with the screw thread of the internal screw thus formed. In addition, the screw driving side end face of the convex portion is configured to form the inclined plane which rises from the end edge position of the end face at the side of the crest of the screw thread toward the crest of the convex portion in a direction opposite to the screw driving direction in which the thread height gradually increases, to reach the crest of the convex portion. With such a configuration, the screw driving side end face of the convex portion is not caught or struck in the prepared hole, so that the prepared hole performs plastic deformation in a smooth manner thereby to form the internal screw.

Accordingly, chips generated at that time are small, and besides, the chips can be made to stay in wide spaces around the screw thread between adjacent convex portions in which no convex portion exists, so that an increase in the torque required for screw driving can be suppressed, and the chips can also be discharged in a smooth manner.

In addition, an outside diameter of the internal screw worked or machined by the convex portion is larger relative to the screw thread of the parallel threaded portion, so the screw thread of the internal screw rises in such a manner that the height thereof gradually increases in the screw driving direction due to the generation of gaps between the external screw member and the internal screw. As a result, the resistance at the time of tightening becomes smaller, and an axial force of the external screw member being screw driven can be made larger when the tightening torque applied thereto is the same.

On the other hand, in cases where the external screw member is screwed into the internal screw to which foreign matter is adhered, the tapered threaded portion functions as a guide for the internal screw, so that the tapered threaded portion first comes into engagement with the internal screw, and then, the parallel threaded portion engages the internal screw, while adjusting the pitches of the external screw member and the internal screw. In a stage in which the external screw member advances into the internal screw from the tapered threaded portion to the parallel threaded portion, the foreign matter is uniformly removed from the internal screw, i.e., from its inner diameter side to its root side, by the convex portion formed on the screw thread of the external screw member, and hence, there is no fear that the external screw member may bite into the foreign matter.

Assuming that an angle of inclination of the screw driving side end face of the convex portion is an angle which is formed, in a projection image of the convex portion projected in an axial direction to a projection plane axially perpendicular to a central axis of the shank, by an inclined line connecting between an end edge of a contour of the end face at the side of the crest of the convex portion and an end edge of the contour at the side of the crest of the screw thread, and a reference line perpendicular to a line connecting between a middle point in a circumferential direction of a contour of the crest of the convex portion and a central axis of a screw shaft, the angle of inclination can be set in the range of from 10 degrees inclusive to 60 degrees inclusive.

When the angle of inclination is too large, in the case of using the external screw member as a self-tapping screw, the external screw member will come into contact with a mating prepared hole in a rapid manner, so a screw driving torque tends to rise or increase easily. On the other hand, when the angle of inclination is too small, there may be a possibility that a sufficient height of the convex portion can not be secured. When the angle of inclination is set in the range of 10 degrees-60 degrees, a sufficient height of the convex portion for scraping foreign matter can be secured, without making the screw driving torque excessively large.

The convex portion can be configured such that one or more convex portions are arranged in a circumferential direction, and in each convex portion, a circumferential length of a crest thereof which is a maximum diameter of the convex portion can be formed in the range of 2.5%-5.0% of a circumference through which the crest of the convex portion passes.

By doing in this manner, a range of the screw thread in which there is no convex portion between adjacent convex portions can be made large, thereby improving the efficiency of discharging chips, paint films, etc. In addition, when the circumferential length of the crest is in this range (i.e., 2.5%-5.0% of the circumference of the screw thread), it is sufficient as a convex portion to shape the internal screw, and it is still possible to prevent a decrease in the tool life due to the provision of unnecessary convex portions.

The convex portion can be configured such that one through ten convex portions are arranged on the circumference at an equal interval.

With such a number of convex portions, there will be no problem about the tool life and the moldability of component rolling, and there will be no influence to the amount of generation of chips and the function of discharging chips at the time of shaping the internal screw. In particular, one through eight convex portions are more preferable.

Moreover, a pressure side flank of the convex portion can be composed of at least two or more flank portions with different flank angles, and the pressure side flank can be configured to have one or more points of inflexion which each become a boundary of each of the flank portions.

This pressure side flank of the screw thread having the convex portion can be configured such that a flank angle of a root side flank portion adjacent to a first point of inflexion is larger than a flank angle of a flank portion at the side of the crest, with the first point of inflexion located at the side closest to the crest as a border.

With such a configuration, only a part of the flank portion at the side of the crest of the pressure side flank will come in contact with the internal screw, and hence, a contact area can be decreased, and an increase in the screw driving torque at the time of shaping the internal screw by the convex portion can be suppressed.

Further, a second point of inflexion can be formed closer to a root side of an external thread than the first point of inflexion, and can be formed of an intermediate flank portion having an angle still larger than that of the root side flank portion, and the flank angles can be set in such a manner that the flank angle of the intermediate flank portion is larger than the flank angle of the root side flank portion, and the flank angle of the root side flank portion is equal to or more than a flank angle of a crest side flank portion.

With this, chips generated at the time of forming the internal screw and painting or coating materials exfoliated from the inner periphery of a nut can be made to stay in a space between the first point of inflexion and the second point of inflexion.

Advantageous Effects of the Disclosure

According to the present disclosure, there can be achieved an external screw member which can be used as a self-tapping screw, and can also be used as a bolt adapted to be screwed into an internal screw, while removing foreign matter adhered thereto, wherein in cases where the external screw member is used as the self-tapping screw, it is possible not only to suppress an increase in driving torque, but also to reduce an amount of chips to be generated, whereas in cases where the external screw member is further used for the internal screw with foreign matter adhered thereto, it is possible not only to remove the foreign matter in a reliable manner, but also to discharge it smoothly, thereby making it possible to prevent jamming or biting of the foreign matter.

DRAWINGS

FIGS. 1A through 1E illustrate an external screw member according to one embodiment of the present disclosure, wherein FIG. 1A is an entire front view of the external screw member; FIG. 1B is an enlarged cross sectional view along a line B-B; FIG. 1C is an enlarged view of the vicinity of a convex portion in FIG. 1A; FIG. 1D is an enlarged cross sectional view of the convex portion in FIG. 1C; and FIG. 1E is a partial perspective view of a convex portion end face at the screw driving side of the convex portion.

FIGS. 5A through 5D illustrate another form of the convex portion of the external screw member of FIGS. 1A through 1E, wherein FIGS. 5A and 5B are cross sectional views illustrating the relation of the external screw member with an internal screw which has been formed in advance, and FIGS. 5C and 5D are cross sectional views in the case of forming or machining an internal screw in a prepared hole.

Figure 6A:
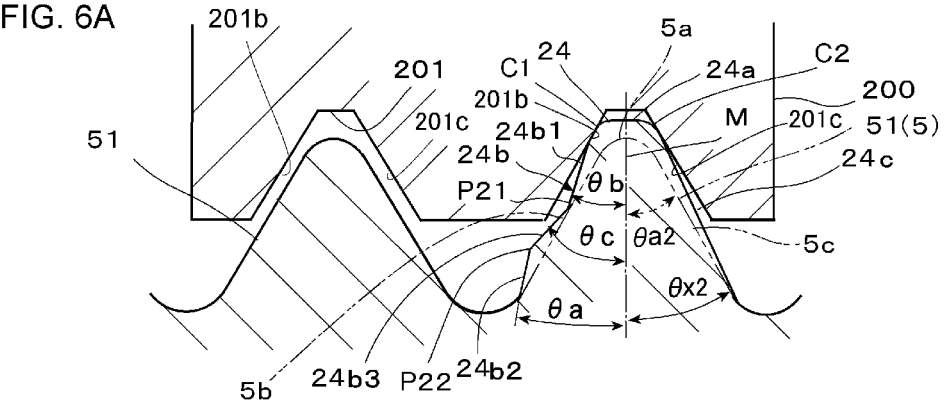
Figure 6B:
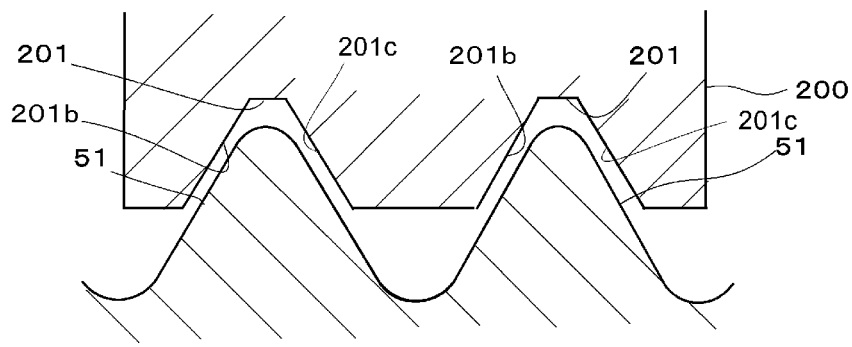
Figure 6C:
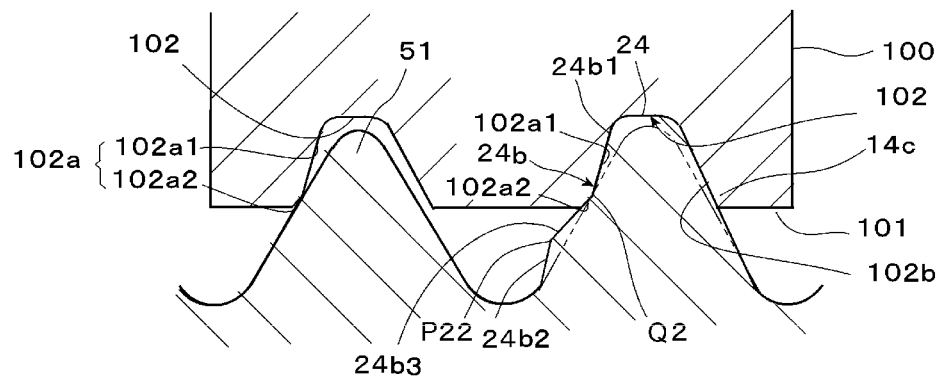
Figure 6D:
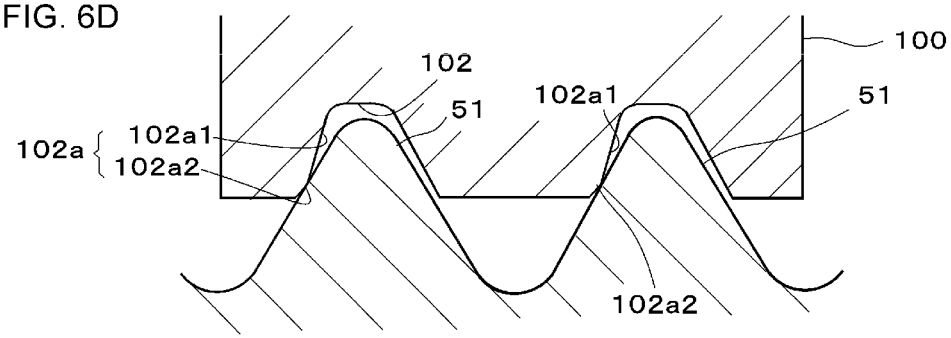

FIGS. 6A through 6D illustrate yet another form of the convex portion of the external screw member of FIG. 1A through 1E, wherein FIGS. 6A and 6B are cross sectional views illustrating the relation of the external screw member with an internal screw which has been formed in advance, and FIGS. 6C and 6D are cross sectional views in the case of forming or machining an internal screw in a prepared hole.

Figure 7A:
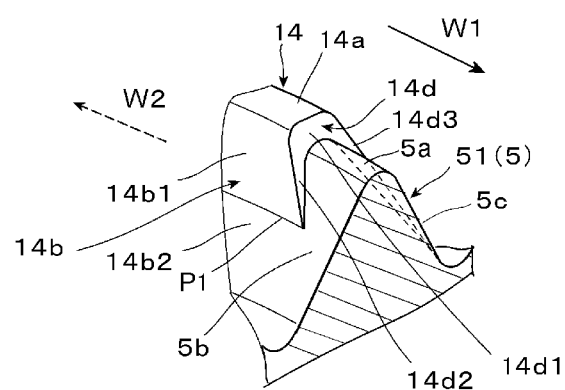

FIG. 7A is a schematic perspective view of the convex portion end face at the screw driving side in FIG. 5.

Figure 7B:
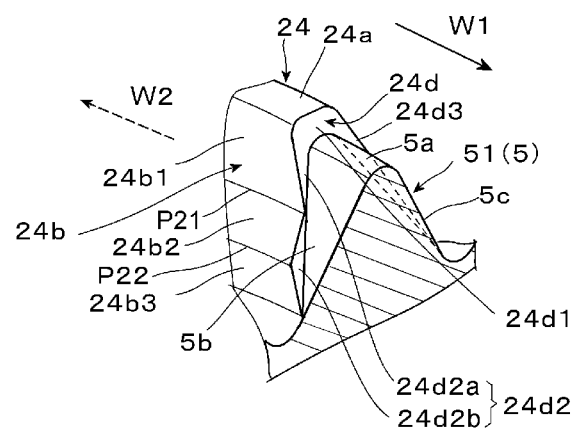

FIG. 7B is a schematic perspective view of the convex portion end face at the screw driving side in FIG. 6.

Figure 8:
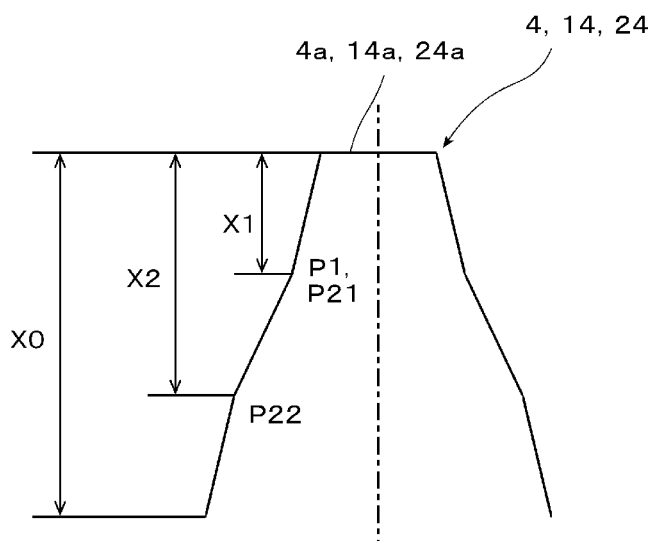

FIG. 8 is an explanatory view of suitable locations of points of inflexion in FIG. 5 and FIG. 6.

DETAILED DESCRIPTION

Hereinafter, reference will be made to a bolt according to an embodiment of the present disclosure, while referring to the accompanying drawings.

Figure 1A:
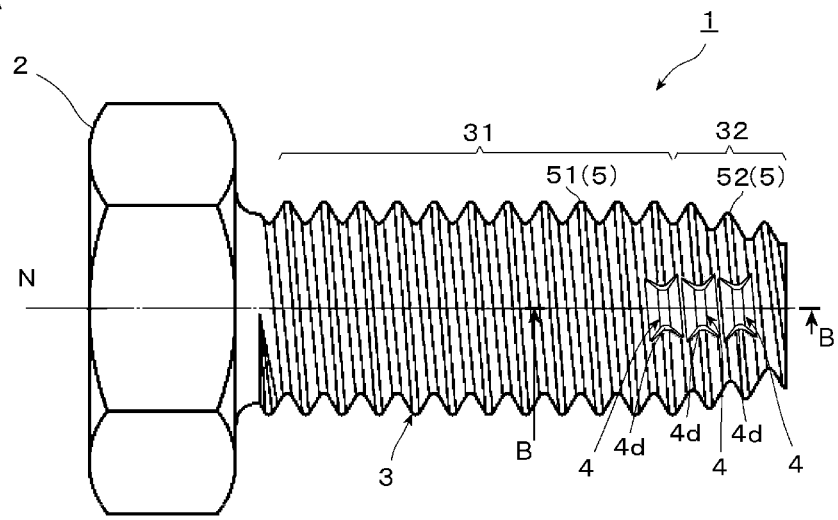
Figure 1B:
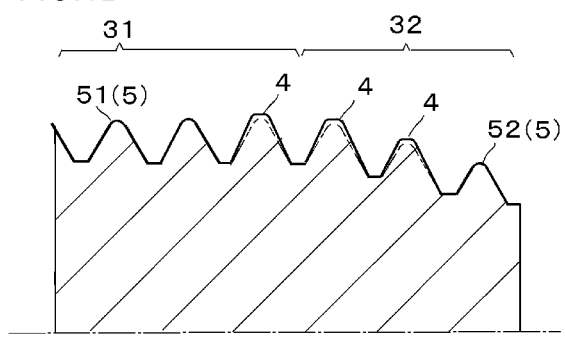
Figure 1C:
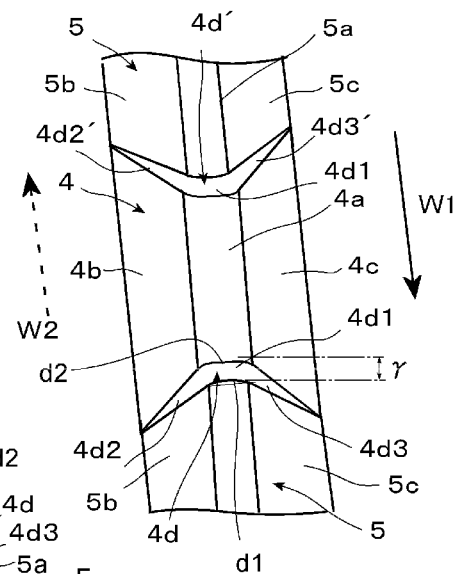
Figure 1D:
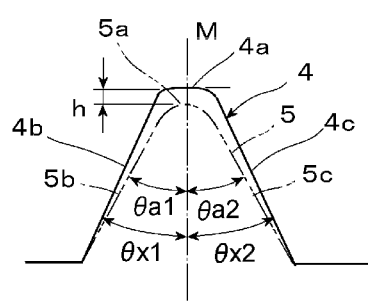
Figure 1E:
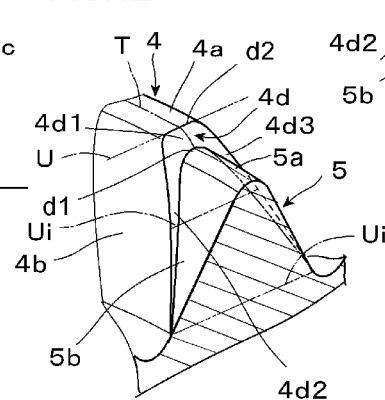

FIGS. 1A through 1E illustrate an external screw member according to one embodiment of the present disclosure, wherein FIG. 1A is a front view of the entire external screw member; FIG. 1B is a half cross sectional view along line B-B; FIG. 1C is an enlarged view of a convex portion in FIG. 1A; FIG. 1D is an enlarged cross sectional view of the convex portion in FIG. 1C; and FIG. 1E is a partial perspective view of a convex portion end face at the screw driving side of the convex portion.

As illustrated in FIG. 1A, an external screw member 1 is provided with a head 2 and a shank 3, and the shank 3 is provided with a parallel threaded portion 31 and a tapered threaded portion 32 in order from the side of the head 2 to the side of a tip end of the shank 3.

For the shape of the head 2, a hexagonal shape is illustrated as an example in FIG. 1A, but the shape of the head 2 is not limited in particular, and a variety of shapes of the head 2 can be applied. Here, note that in the illustrated example, a bolt with a pitch diameter body is shown as an example, but the disclosure can also be applied to a bolt with a nominal diameter body.

A screw thread 5 is continuously formed in the parallel threaded portion 31 and the tapered threaded portion 32 at the same or constant pitch, and the screw thread 5 is formed in such a shape that in the tapered threaded portion 32, the height of the thread 5 (thread height) gradually decreases.

When the screw thread 5 in the range of the parallel threaded portion 31 is assumed as a parallel screw thread 51, the parallel screw thread 51 is a screw thread which has a constant outside diameter and a constant root diameter, whereas when the screw thread 5 in the range of the tapered threaded portion 32 is assumed as a tapered screw thread 52, the tapered screw thread 52 is formed in such a shape that it has the same pitch as the parallel screw thread 51 of the parallel threaded portion 31, and that the outside diameter and the height of the thread 52 gradually decrease from the parallel threaded portion 31 toward the tip end thereof.

In a part of the screw thread 5 extending from the tapered threaded portion 32 to the parallel threaded portion 31, there are formed convex portions 4 protruding in a radially outer direction from the crest 5a of the screw thread 5 (hereinafter, referred to as a screw thread crest 5a). In this embodiment, three convex portions are provided at an equal pitch for each turn of the screw thread (i.e., three convex portions per turn of the thread), and more specifically, three pieces of convex portions are arranged for one turn of the parallel screw thread 51 in the parallel threaded portion 31, and six pieces of convex portions are arranged for two turns of the tapered screw thread 52 in the tapered threaded portion 32, and hence, nine pieces of convex portions in total are arranged as a whole. Three convex portions arranged for each turn of the screw thread are identical in circumferential phase with those of the three turns, and are arranged axially in series with those of the three turns. In FIG. 1A, only one convex portion 4 is illustrated among three pieces of convex portions for one turn of the screw thread, and the remaining two convex portions are located at the back side of the drawing sheet.

The convex portions 4 each project in the radially outer direction from the outside diameter of the screw thread 5 in the portions in which the convex portions 4 are formed. The tapered screw thread 52 gradually increases in diameter toward the parallel screw thread 51 in a spiral manner, as illustrated in FIG. 1C. In the convex portions 4 formed in the tapered screw thread 52, the most tip side convex portion located at the most tip side of the screw thread 52 is the smallest in diameter, and as the tapered screw thread 52 increases in diameter from its tip end toward the parallel screw thread 51, the diameters of the convex portions 4 become gradually larger, so that the three convex portions 4 formed in the parallel screw thread 51 are the largest in diameter and have a constant diameter. An amount of protrusion of each convex portion 4 in the height direction with respect to the screw thread 5 is constant, and the outside diameter of each convex portion 4 is formed to decrease toward the tip of the screw, following the outside diameter of the tapered screw thread 52.

Here, it is preferable that the number of convex portions 4 be in the range of 1 to 10 pieces on the circumference for one turn of the screw thread 5. In such a range, the interval of adjacent convex portions 4 can be taken sufficiently wide, and hence, form rolling or component rolling of the convex portions 4 is easy, and a tool life in this case is also not changed in comparison with the case of general screw thread shaping. However, when considering the ease of further form rolling, the point of view of the tool life, the amount of chips generated and the function of discharging chips at the time of screw thread shaping, 1 to 8 pieces of convex portions are more preferable.

Next, a convex portion 4 will be described in detail, while referring to FIGS. 1C through 1E.

Although FIGS. 1C through 1E illustrate one convex portion 4 formed in the parallel screw thread 51, the convex portions 4 formed in the tapered screw thread 52 are each also basically of the same structure, so in the following explanation, the parallel screw thread 51 and the tapered screw thread 52 will be comprehensively handled as a screw thread 5, and relations of the parallel screw thread 51 and the tapered screw thread 52 with the convex portions 4 will be explained as a relation between the screw thread 5 and the convex portions 4 (hereinafter, sometimes simply referred to as the convex portion 4).

The convex portion 4 is provided with a convex crest 4a extending a predetermined length along the screw thread crest 5a of the screw thread 5, a pressure side convex flank 4b extending from this convex crest 4a toward a thread bottom at the side of the head 2, and a clearance side convex flank 4c extending from the convex crest 4a toward a thread bottom at the side of a screw tip, wherein a cross sectional shape cut on a surface passing through a central axis N of the shank 3 is a triangular pyramid shape provided with the convex crest 4a of a predetermined width. A projection height h of the convex crest 4a from the screw thread crest 5a is the same or constant along the circumferential direction (i.e., the diameter of the convex crest 4a from the central axis of the shank 3 is the same), and a convex portion end face 4d at the screw driving side inclines in a direction in which a root side portion thereof protrudes forward in the screw driving direction toward the screw thread crest 5a. That is, the convex portion end face 4d at the screw driving side is a slope or inclined surface in which the position of an end edge d1 at the side of the screw thread crest is located ahead of an end edge d2 at the side of the convex crest in the screw driving direction (i.e., in a position in which a phase in the circumferential direction is advanced forward by an angle γ in the screw driving direction), wherein the slope or inclined surface gradually rises up from the end edge d1 at the side of the screw thread crest 5a toward the end edge d2 at the side of the convex crest 4a in a direction W2 opposite to the screw driving direction of the screw thread 5, and leads to the crest 4a of the convex portion 4.

A width in an axial direction (i.e., in a direction parallel to the central axis N) of the convex crest 4a (hereinafter, referred to as a crest width) is larger than the crest width of the screw thread crest 5a, and the convex crest 4a protrudes in a height direction and in a crest width direction as well with respect to the screw thread crest 5a. That is, the pressure side convex flank 4b and the clearance side convex flank 4c protrude more in the crest width direction at the side of the convex crest 4a than the pressure side flank 5b and the clearance side flank 5c of the screw thread 5. On the other hand, a thread root width between the root side lower end edges of the pressure side convex flank 4b and the clearance side convex flank 4c is substantially identical or equal to a thread root width between the root side lower end edges of the pressure side flank 5b and the clearance side flank 5c of the screw thread 5 with the same height as the convex portion 4. Accordingly, the pressure side convex flank 4b and the clearance side convex flank 4c incline linearly from the convex crest 4a toward the thread bottom, as illustrated in FIG. 1D, wherein a flank angle θx1 of the pressure side convex flank 4b is smaller than a flank angle θa1 of the pressure side flank 5b of the screw thread 5, and a flank angle θx2 of the clearance side convex flank 4c is also smaller than a flank angle θa2 of the clearance side flank 5c of the screw thread 5. In the illustrated example, the flank angle θx1 of the pressure side convex flank 4b and the flank angle θx2 of the clearance side convex flank 4c are the same (θx1=θx2), and the flank angle θa1 of the pressure side flank 5b and the flank angle θa2 of the clearance side flank 5c of the screw thread 5 are the same (θa1=θa2), and hence, the convex portion 4 and the screw thread 5 each have a left-right symmetrical shape, but may be unsymmetrical. That is, the flank angle θx1 of the pressure side convex flank 4b and the flank angle θx2 of the clearance side convex flank 4c may not be the same (θx1≠θx2), and the flank angle θa1 of the pressure side flank 5b and the flank angle θa2 of the clearance side flank 5c of the screw thread 5 may not be the same (θa1≠θa2), either.

Here, note that the lower end edges (root side end portions) of the pressure side convex flank 4b and the clearance side convex flank 4c may be middle portions of the pressure side flank 5b and the clearance side flank 5c of the screw thread 5.

The convex portion end face 4d at the screw driving side is provided with a crest region 4d1 of a trapezoidal shape extending from the convex crest 4a to its end edge d1 at the side of the screw thread crest, and a pressure side flank end region 4d2 and a clearance side flank end region 4d3 branching from the crest region 4d1 and extending in an inverted V shape along the end edges in the screw driving direction of the pressure side convex flank 4b and the clearance side convex flank 4c. The crest region 4d1 of the convex portion end face 4d, the pressure side flank end region 4d2 and the clearance side flank end region 4d3 are configured to gradually incline toward the root portion forwardly in the screw driving direction.

In cases where a helical line T passing through the screw thread crest 5a and the convex crest 4a is drawn and a straight line U is drawn which is orthogonal to a tangent line of the helical line T at an intersection between the end edge d1 of the convex end face 4d at the side of the screw thread crest 5a and the helical line T, the end edge d1 of the convex portion end face 4d extends linearly by a predetermined width in parallel to the straight line U. Then, the crest region 4d1 of the convex portion end face 4d, the pressure side flank end region 4d2 and the clearance side flank end region 4d3 are configured to form an inclined surface located on a straight line Ui parallel to the straight line U at every position in the height direction. In this example, this inclined surface is located on a curve surface which is a convexly curved plane.

Here, note that the convex portion end face 4d at the screw driving side may incline linearly in a lead direction, or may be a concavely curved surface which is recessed in a concave shape in such a manner that an angle of inclination becomes gradually smaller from the crest side toward the root side. In addition, the end edge d1 of the convex portion end face 4d at the side of the screw thread crest 5a may not be parallel to the straight line U as illustrated in FIG. 1E, but may be parallel to the central axis N, and the crest region 4d1 of the convex portion end face 4d, the pressure side flank end region 4d2 and the clearance side flank end region 4d3 may be configured to form an inclined surface located on a straight line parallel to the central axis N at every position in the height direction. Moreover, with respect to the direction of the convex portion end face 4d parallel to the straight line U or parallel to the central axis N, too, the convex portion end face 4d may also be formed into a convexly curved shape.

[Angle of Inclination θ of the Convex Portion End Face at the Screw Driving Side]

Next, an angle of inclination θ of the convex portion end face 4d will be explained below with reference to FIG. 2.

Figure 2A:
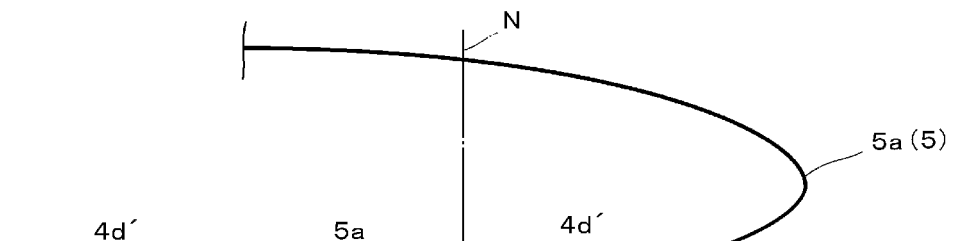
FIG. 2A is a perspective view schematically illustrating, with a helical line, the contours or outlines of a screw thread crest and a convex portion crest of the external screw member of FIGS. 1A through 1E.
Figure 2B:
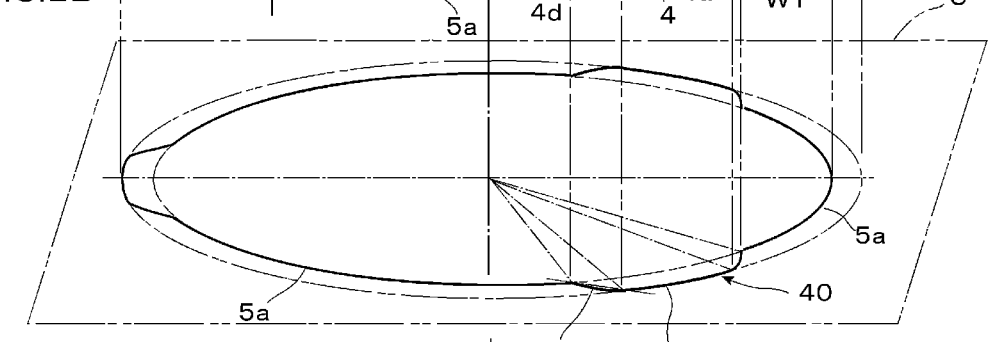
FIG. 2B is a perspective view in which the helical line in FIG. 2A is projected on a plane of projection axially perpendicular to the axis of the helical line.
Figure 2C:
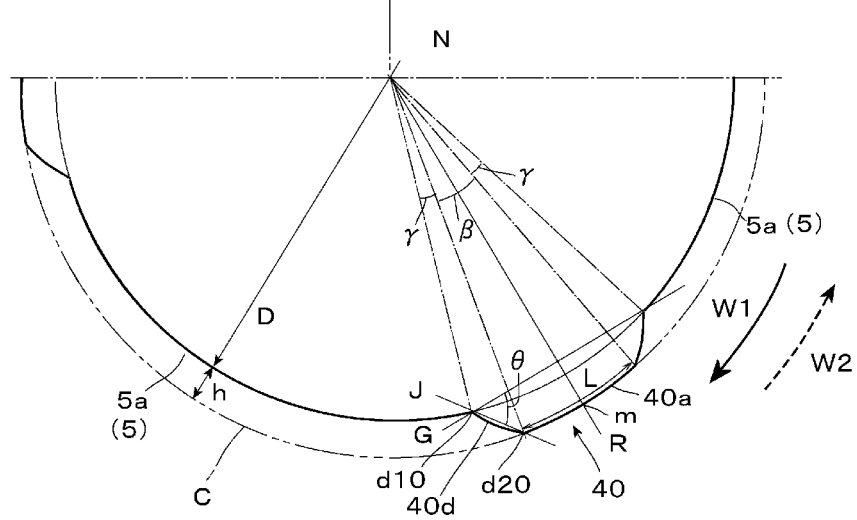
FIG. 2C is a half plan view of FIG. 2B.

FIG. 2A is a perspective view schematically illustrating the contours or outlines of the helically extending screw thread crest 5a and the helically extending convex crest 4a (i.e., the outline of the helical line T in FIG. 1E). FIG. 2B is a perspective view in which the helical line in FIG. 2A is axially projected on a plane of projection S perpendicular to the central axis N of the shank 3. FIG. 2C is a half plan view of FIG. 2B.

Preferably, the angle of inclination θ of the convex portion end face 4d at the screw driving side is set to an angle of 10-60 degrees, and more preferably, it is set to an angle of 14-35 degrees. This angle of inclination θ of the convex portion end face 4d at the screw driving side is defined as an angle formed by an inclined line J connecting between an end edge d20 at the side of the convex crest and an end edge d10 at the side of the screw thread crest, of an end face outline 40d (i.e., an outline of the crest region 4d1 of the convex portion end face 4d), which is an outline of the convex end face 4d, and a reference line G perpendicular to a diameter line R connecting between a middle point m in the circumferential direction of the convex crest outline 40a and the central axis N of the shank 3, in a convex portion projection image 40 (see FIGS. 2B and 2C) which is formed by projecting each convex portion 4 in the axial direction on the plane of projection S perpendicular to the central axis N of the shank 3, as illustrated in FIGS. 2B and 2C. That is, in the illustrated example, the convex portion end face 4d is swollen in the shape of a convex circular arc, but irrespective of the swelling, the angle of inclination θ of the convex portion end face 4d is defined as an angle formed by the reference line G and the inclined line J connecting between the end edge d20 at the side of the convex crest and the end edge d10 at the side of the screw thread crest. The reference line G is parallel to a tangent line which is in contact with the middle point m of the convex crest outline 40a, and hence, the angle of inclination θ is also the same as an angle formed by the inclined line J and the tangent at the middle point m.

When the angle of inclination θ of the convex portion end face 4d is too large, in the case of using the external screw member 1 as a self-tapping screw, the external screw member 1 will come into contact with a mating prepared hole in a rapid manner, so screw driving torque tends to rise easily. On the other hand, when the angle of inclination θ is too small, there may be a possibility that a sufficient height of each convex portion 4 can not be secured.

In one convex portion projection image 40, a peripheral or circumferential length L of the convex crest outline 40a, which is a maximum diameter, is set in the range of 2.5-5.0% of the circumference of a virtual circle C which passes through the convex crest outline 40a. Because there are three convex portion projection images 40 in three places, the peripheral or circumferential lengths of the convex crest outlines 40a in total occupies a range of 7.5-15.0% of the circumference of the virtual circle C. This virtual circle C is a circle with an outside diameter of (D+2 h) with respect to an outside diameter D of the parallel threaded portion 31, and the convex crest outline 40a is a circular arc with a central angle β, wherein the central angle β is in the range of 2.5-5.0% of 360 degrees, i.e., in the range of 9-18 degrees, and hence, a total of central angles in the three places is in the range of 27-54 degrees.

In addition, when considering an angle γ of the convex portion end face 4d, it is in the range of 1-7 degrees, i.e., in the range of about 0.28-1.94% of 360 degrees. When a convex portion end face 4d' at the clearance side is included (i.e., γ is added), the ratio of an angle 2γ is in the range of about 0.56-3.88% of 360 degrees, and with three pieces of convex portions 4, 2γ×3 (2γ multiplied by 3) is obtained, and the ratio of angles for them in total is in the range of about 1.68-11.64% of 360 degrees.

By setting the circumferential length L of the convex crest outline 40a in the range of 2.5-5.0% of the circumference of the screw thread 5, chips generated upon forming the internal screw and foreign matter (chips, paint film powder etc.) at the time of removing foreign substances such as painting, coating sputter, etc., attached to the inside of a nut can be made to stay in the portions of the screw thread 5 between the adjacent convex portions 4 (i.e., three places each with a circumferential length in the range of 28-30% of the circumference), whereby when a tip end portion of the external screw member 1 goes through the prepared hole in the mating member or the internal screw member, chips and peeled pieces of a coating material can be discharged, and a discharge function can be improved.

Further, when the circumferential length L is about 2.5 to 5.0% of the circumference of the screw thread 5, each convex portion 4, which functions to shape the internal screw, can plastically deform the material of the internal screw member to a sufficient extent, and it is still possible to prevent a decrease in the tool life due to the provision of unnecessary convex portions.

Here, note that a convex portion end face $4d'$ of the convex portion 4 in the opposite direction W2 to the screw driving direction of the screw thread is the same in basic configuration as the convex portion end face 4d in the screw driving direction of the convex portion 4, except for being opposite in the direction of inclination to the convex portion end face 4d, and hence, the same component parts of the convex portion end face $4d'$ as those of the convex portion end face 4d are denoted by the same reference numerals and characters, and the explanation thereof is omitted. By employing the same configuration as the convex portion end face 4d, in particular, making the angle of inclination of the convex portion end face $4d'$ similar to that of the convex portion end face 4d, it is possible to attain the ease of form rolling and the extension of the life-span of a working tool, as in the case of the convex portion end face 4d.

Although in this embodiment, the convex portions 4 are arranged in both the parallel threaded portion 31 and the tapered threaded portion 32, the convex portions each need only to have a height projected from the outside diameter line of the parallel threaded portion 31, and the configuration may be such that at least one convex portion is formed on the screw thread of at least either one of the parallel threaded portion 31 and the tapered threaded portion 32. That is, at least one convex portion may be formed in only the parallel threaded portion 31, or may be formed in only the tapered threaded portion 32, or may be formed in both of the parallel threaded portion 31 and the tapered threaded portion 32.

Next, reference will be made to the operation of this embodiment.

(Use of the External Screw Member as a Self-Tapping Screw)

Figure 3A:
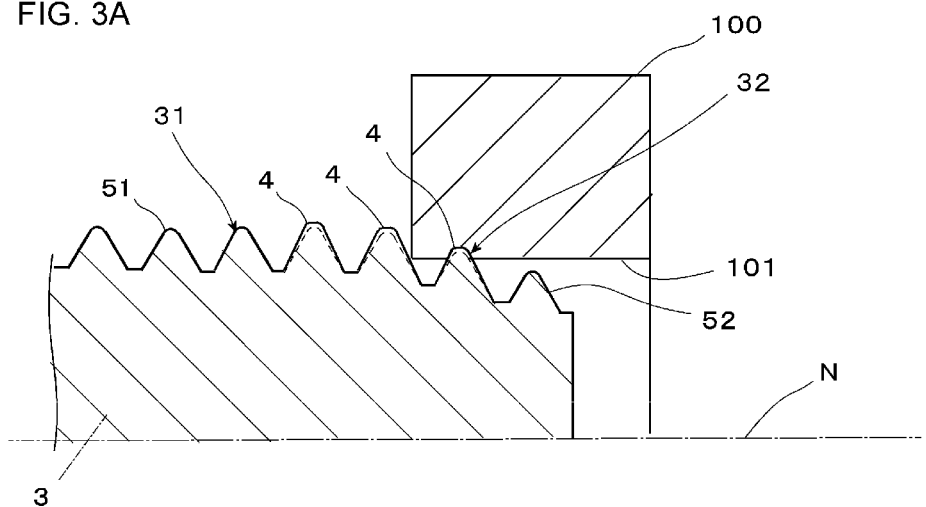
FIGS. 3A through 3C are schematic cross sectional views in a state where the external screw member of FIGS. 1A through 1E is used as a self-tapping screw.
Figure 3B:
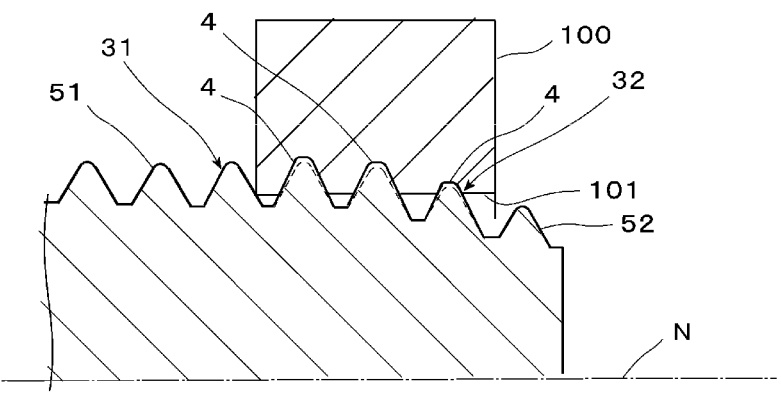

In cases where the external screw member is used as a self-tapping screw, as illustrated in FIGS. 3A and 3B, the tapered screw thread 52 of the tapered threaded portion 32 gradually bites into the inner periphery of a prepared hole 101 formed in a mating member 100 as it is screw driven into the prepared hole 101, so that the internal screw is machined or worked into a shape expanded by a predetermined size with respect to the screw thread 5 by means of the convex portions 4 formed in the portion extending from the tapered threaded portion 32 to the parallel threaded portion 31.

Then, the convex portion end face 4d in the screw driving direction W1 of each convex portion 4 forms an inclined plane in which the height of the screw thread thereof gradually rises from the end edge d1 thereof at the side of the screw thread crest toward the convex crest 4a in the opposite direction W2 to the screw driving direction of the screw thread 5. With such a configuration, the convex portion end face 4d (i.e., a screw driving side end face) of each convex portion 4 is not caught or struck in the prepared hole 101, so that the prepared hole 101 can be plastically deformed in a smooth manner thereby to form the internal screw.

Accordingly, chips generated at that time are small, and besides, the chips can be made to stay in wide spaces around the screw thread 5 between adjacent convex portions 4 in which no convex portion exists, so that an increase in the torque required for screw driving can be suppressed, and the chips can also be discharged in a smooth manner.

Figure 3C:
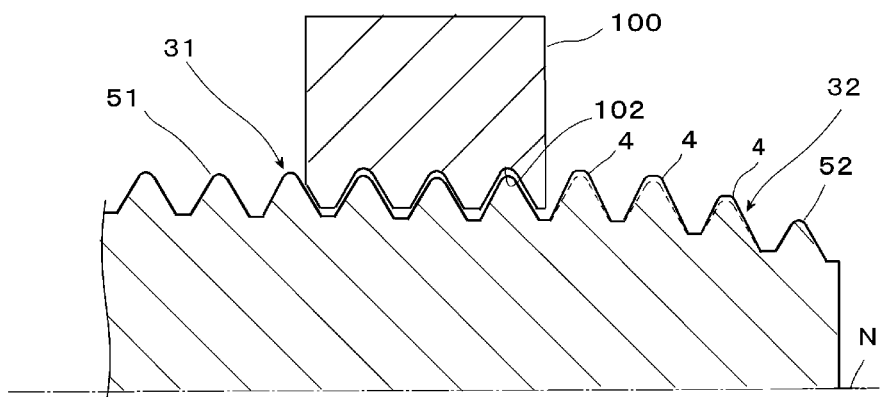

Further, because the internal screw is formed by the convex portions 4, as illustrated in FIG. 3C, the parallel screw thread 51 of the parallel threaded portion 31 has gaps with respect to the internal screw thus formed, and a clearance become smaller than in the case of a normal nut, and hence, a backlash between the external screw and the internal screw is small, which is effective to prevent loosening.

(Use of the External Screw Member as a Bolt for an Internal Screw Member with Foreign Matter Adhered Thereto)

Figure 4A:
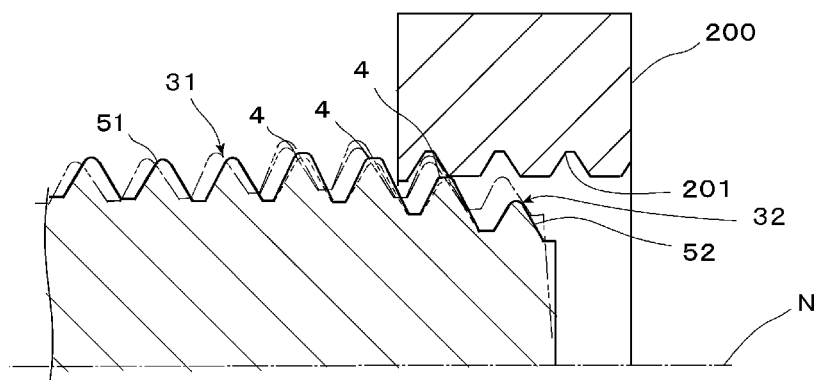
FIGS. 4A through 4C are schematic cross sectional views each illustrating a state where foreign matter on an inner periphery of an internal screw is removed by the external screw member of FIGS. 1A through 1E.
Figure 4B:
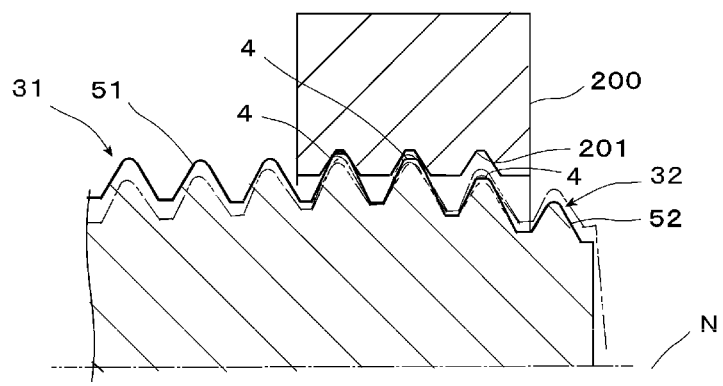
Figure 4C:
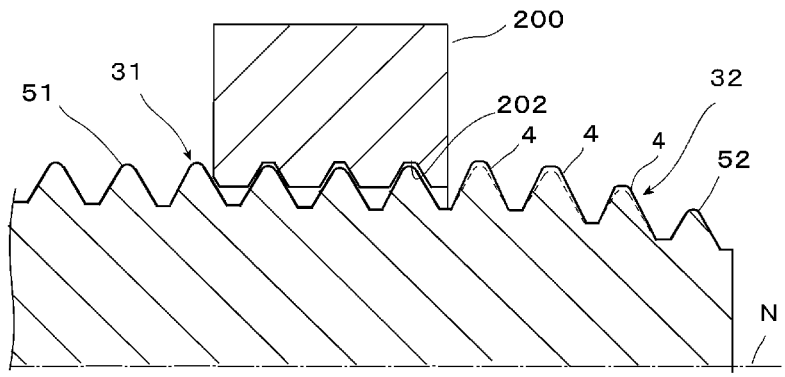

On the other hand, in cases where the external screw member 1 is screw driven into an internal screw member 200 with foreign matter adhered thereto, as illustrated in FIGS. 4A and 4B, the tapered threaded portion 32 functions as a guide for the internal screw member 200, so that the tapered threaded portion 32 first comes into engagement with an internal screw 201 of the internal screw member 200, and then, the parallel threaded portion 31 engages the internal screw 201, while adjusting the pitch of the internal screw 201 with the external screw.

Then, in a stage or process in which the convex portions 4 advance into the internal screw 201, foreign matter such as paint films or coating films, sputter, etc., adhered to the internal screw 201 are gradually removed from an inside diameter side to a root bottom side of the internal screw 201 by means of the convex portions 4, and finally, the contour or outline of the convex portion end face 4d in the screw driving direction of each convex portion 4 formed in the parallel threaded portion 31 substantially comes into match with the cross sectional shape of the internal screw 201, and the adhered foreign matter is substantially completely scraped to be removed.

The external screw member 1 has a self-tapping function, and so, even if the shape of the internal screw 201 has more or less distortion, the shape of the internal screw 201 is corrected in an appropriate manner by the self-tapping function of the tapered threaded portion 32, so that the parallel threaded portion 31 following the tapered threaded portion 32 comes into fitting engagement with the internal screw 201 in a smooth manner, and there is no fear that foreign matter is bitten into and stuck to the external screw member 1.

In addition, the convex portions 4 increases in diameter successively from the tapered threaded portion 32 to the parallel threaded portion 31, so that foreign matter such as paint application, sputter, etc., can be gradually exfoliated or scraped in a uniform manner from the inside diameter side to the outside diameter side of the internal screw 201, thus making it possible to avoid a rapid torque rise.

[Modifications of the Convex Portion]

Next, reference will be made to modifications of the convex portion. In the following explanation, the differences of the modifications from the above-mentioned embodiment will be mainly described, and the same components will be denoted by the same symbols, and the explanation thereof will be omitted.

First Modification

FIGS. 5A through 5D and FIG. 7A illustrate a first modification of the convex portion.

Figure 5A:
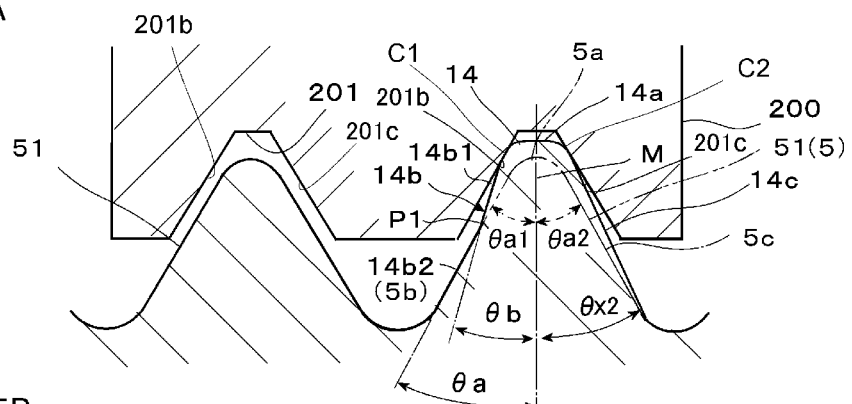
Figure 5B:
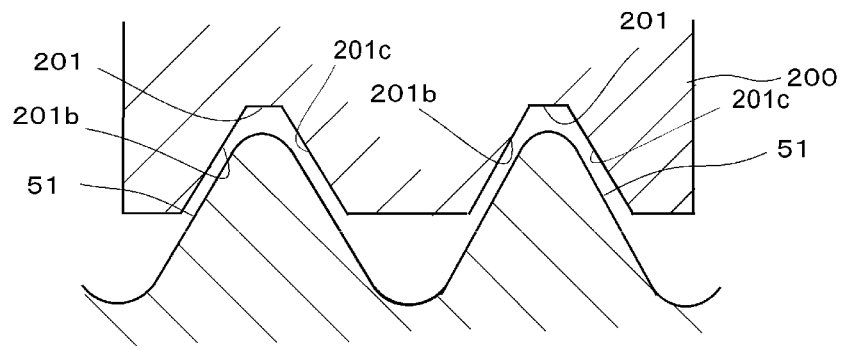
Figure 5C:
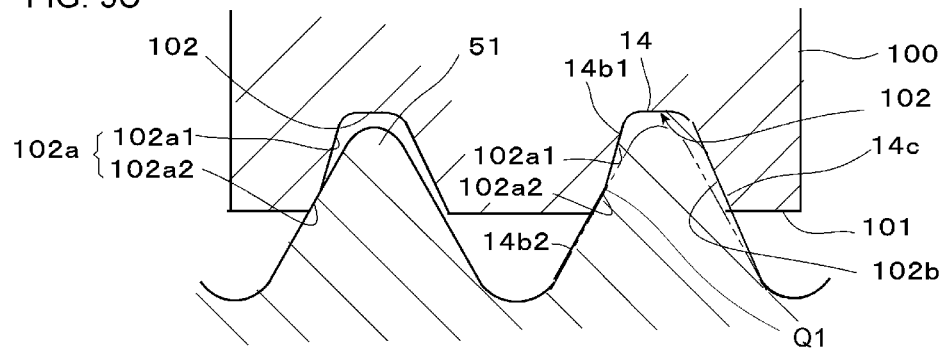
Figure 5D:
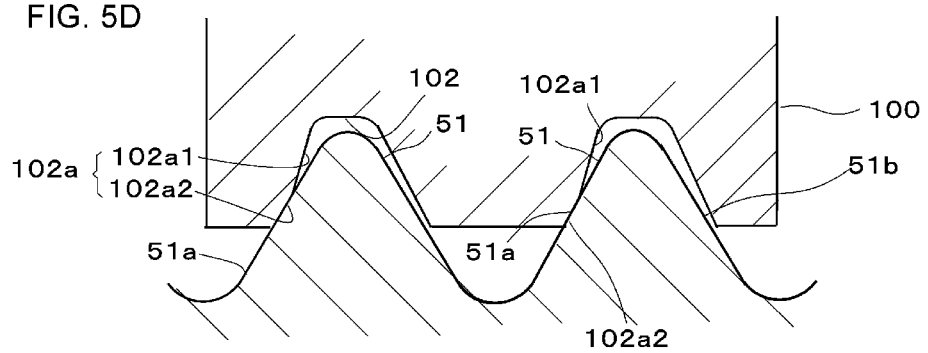

FIGS. 5A and 5B, respectively, schematically illustrate the fitting engagement states of screw threads in the case of using the external screw member as a bolt for removing foreign matter, and FIGS. 5C and 5D, respectively, schematically illustrate the fitting engagement states of screw threads in the case of using the external screw member as a self-tapping screw.

Here, the structure of a convex portion will be explained by referring to FIG. 5A.

FIG. 5A illustrates a convex portion 14 formed in a parallel screw thread 51, and one screw thread or ridge of the parallel screw thread 51 following the convex portion 14. In addition, in a cross section of the convex portion 14, a thread or ridge shape of the parallel screw thread 51 is shown by an imaginary (phantom) line (an alternate long and two short dashes line) for the sake of comparison with the parallel screw thread 51. Although the parallel screw thread 51 is illustrated as an example, the same is also applicable to a tapered screw thread, wherein a screw thread crest is denoted by 5a, a pressure side flank is denoted by 5b, and a clearance side flank is denoted by 5a.

In this first modification, a pressure side flank 14b of the parallel screw thread 51 having the convex portion 14 includes a crest side flank portion 14b1, which is a pressure side convex flank, and a root side flank portion 14b2 which is constituted by the pressure side flank 5b of the parallel screw thread 51. A boundary between these two flank portions 14b1, 14b2 becomes a point of inflexion P1, and flank angles of these flank portions have the following relation: (a flank angle θa of the root side flank portion 14b2)>(a flank angle θb of the crest side flank portion 14b1). In this example, the flank angle θa of the root side flank portion 14b2 is equal to the flank angle θa1 of the pressure side flank 5b of the parallel screw thread 51, and a corner C1 between the crest side flank portion 14b1 and a convex crest 14a is in abutment with a pressure side flank 201b of an internal screw 201. The corner C1 is rounded. Here, note that in this example, the root side flank portion 14b2 is constituted by the pressure side flank 5b of the parallel screw thread 51, but it may be constituted by the convex portion.

In addition, a clearance side convex flank 14c has a flank angle which is smaller than the flank angle θa2 of the clearance side flank 5c of the parallel screw thread 51, and the clearance side convex flank 14c has no step formed in its root portion with the clearance side flank 5c of the screw thread 5. Moreover, a corner C2 between the clearance side convex flank 14c and the convex crest 14a is in abutment with a clearance side flank 201c of the internal screw 201, and the corner C2 is rounded.

FIG. 7A is a partial perspective view looking obliquely at a convex portion end face 14d in the screw driving direction of the convex portion 14.

Similar to the above-mentioned embodiment, the convex portion end face 14d inclines in a direction in which a root side portion thereof protrudes forward in the screw driving direction W1 toward the screw thread crest 5a. That is, the convex portion end face 14d at the screw driving side is a slope or inclined surface which gradually rises up from an end edge at the side of the screw thread crest 5a toward an end edge at the side of the convex crest 14a in a direction W2 opposite to the screw driving direction of the screw thread 5, and leads to the crest 14a of the convex portion 14.

The convex portion end face 14d is provided with a crest region 14d1 of a trapezoidal shape extending from the convex crest 14a to an end edge at the side of the screw thread crest, and a pressure side flank end region 14d2 and a clearance side flank end region 14d3 branching from the crest region 14d1 and extending in an inverted V shape along the crest side flank portion 14b1 of the pressure side flank 14b and an end edge in the screw driving direction of the clearance side convex flank 14c. The pressure side flank end region 14d2 is shorter than the clearance side flank end region 14d3.

Operation of the First Modification (Use of the External Screw Member as a Bolt for Removing Foreign Matter)

In cases where the external screw member is used as a bolt for removing foreign matter, as illustrated in FIG. 5A, only a corner formed by the convex crest 14a, the pressure side flank 14b and the clearance side convex flank 14c is in contact with the internal screw 201, and hence, contact pressure can act intensively on foreign matter, so that the foreign matter such as painting, coating, sputter, etc., can be removed in an efficient manner.

In addition, although it is configured such that the corner of the convex portion 14 at the side of the convex crest 14a is in partial contact with the internal screw 201, the foreign matter can be peeled or exfoliated in a wider area than a partial contact area due to the eccentricity (i.e., eccentric movement) of the bolt or external screw member relative to the internal screw member. Moreover, by providing the convex portion 14 on each of the parallel screw thread 51 and the tapered screw thread 52, the peeling or exfoliation of the foreign matter can be carried out in a much wider area extending from the vicinity of the inside diameter portion of the internal screw to the convex crest of the parallel screw thread 51.

Moreover, the maximum diameter of each convex portion 14 gradually increases from the tapered screw thread 52, and each convex portion 14 is screw driven into the internal screw member, while being in abutment with the inside diameter side portions of the pressure side flank and the clearance side flank of the internal screw, so that foreign matter will be gradually scraped from the inside diameter side of the internal screw, and finally, each convex portion 14 will come into abutment with the inner deep portions of the internal screw, thus scraping off foreign matter therefrom. Accordingly, even with the partial contact, it is possible to scrape off the foreign matter such as painting, coating, etc., adhered to the pressure side flank 201b and the clearance side flank 201c, from the inside diameter side to the thread bottom side in a uniform manner.

FIG. 5B illustrates a state where the convex portion 14 has passed through the internal screw 201, with foreign matter such as painting, coating, etc., and impurities in the internal screw 201 removed. From this state, the following parallel screw thread 51 comes into engagement with the internal screw 201, so that the external screw member is finally tightened and fixed to the internal screw member.

(Use of the External Screw Member as a Self-Tapping Screw)

FIGS. 5C and 5D, respectively, schematically illustrate the states where the external screw member is used as a self-tapping screw.

FIG. 5C illustrates a state where the tapered threaded portion has passed through the prepared hole 101 in the mating member 100, and the convex portion 14 formed in the first turn of the parallel screw thread 51 is formed into a final screw thread shape of the internal screw 102. The cross sectional shape of the root portion of the internal screw 102 is finally processed or formed by following the cross sectional shape of the convex portion 14 formed in this parallel screw thread 51, and as illustrated in FIG. 5D, the following parallel screw thread 51 advances into the internal screw 102 thus formed, and is finally tightened and fixed thereto.

With the convex portion 14 of this mode or modification, too, at the time of machining the internal screw, as shown in FIG. 7A, the convex portion end face 14d in the screw driving direction forms an inclined plane in which the height of the screw thread thereof rises in a direction to gradually increase from the position of an end edge of the screw thread 5 at the crest side toward a crest side end edge of the convex portion 14 in the opposite direction W2 to the screw driving direction of the screw thread 5. With such a configuration, the prepared hole 101 can be plastically deformed in a smooth manner thereby to form the internal screw. In particular, a range of the internal screw in which it is deformed by the pressure side flank end region 14d2 of the convex portion end face 14d becomes narrow, so that an amount of chips to be generated can be more decreased, and at the same time, screw driving torque can be made smaller.

In addition, the internal screw 102 formed according to the cross sectional shape of the convex portion 14 is configured such that a pressure side flank 102a has a crest side flank portion 102a1 and a root side flank portion 102a2, and that a point of inflexion Q1 is formed at a boundary between these two flank portions 102a1, 102a2. Accordingly, when tightened, a pressure side flank 51a of the parallel screw thread 51 will come into abutment with the root side flank portion 102a2 of the pressure side flank 102a of the internal screw 102.

Second Modification

FIGS. 6A through 6D and FIG. 7B illustrate a second modification of the convex portion.

In this second modification, it is configured such that there exist two points of inflexion P21, P22.

FIGS. 6A and 6B, respectively, schematically illustrate the fitting engagement states of the external screw thread with respect to the internal screw thread 201 of the internal screw member 200 with foreign matter adhered thereto, and FIGS. 6C and 6D, respectively, schematically illustrate the fitting engagement states of the screw threads in the case of using the external screw member as a self-tapping screw.

First, the structure of a convex portion will be explained by referring to FIG. 6A.

FIG. 6A also illustrates a convex portion 24 formed in a parallel screw thread 51, and one screw thread or ridge of the parallel screw thread 51 following the convex portion 24. In addition, in a cross section of the convex portion 24, a thread or ridge shape of the parallel screw thread 51 is shown by an imaginary (phantom) line (an alternate long and two short dashes line) for the sake of comparison with the parallel screw thread 51.

In this second modification, an intermediate flank portion 24b3 is arranged between a crest side flank portion 24b1 and a root side flank portion 14b2 of a pressure side convex flank 24b of the parallel screw thread 51 having the convex portion 24. In addition, a concavely curved or bent first point of inflexion P21 is formed at a boundary between the crest side flank portion 24b1 and the intermediate flank portion 24b3, and a convexly curved or bent second point of inflexion P22 is formed between the intermediate flank portion 24b3 and the root side flank portion 24b2.

Flank angles of three flank portions in this pressure side convex flank 24b are set as follows: (flank angle $\theta c$ of the intermediate flank portion 24b3)>(flank angle $\theta a$ of the root side flank portion 24b2) (flank angle $\theta b$ of the crest side flank portion 24b1).

That is, the second point of inflexion P22 is formed closer to the root portion side than the first point of inflexion P21, and is formed of the intermediate flank portion 24b3 having an angle still larger than that of the root side flank portion 24b2. Also, the flank angles are set such that the flank angle $\theta c$ of the intermediate flank portion 24b3 is larger than the flank angle $\theta a$ of the root side flank portion 24b2, and the flank angle $\theta a$ of the root side flank portion 24b2 is equal to or more than the flank angle $\theta b$ of the crest side flank portion 24b1.

In addition, a clearance side convex flank 24c has a flank angle which is smaller than the flank angle $\theta a2$ of the clearance side flank 5c of the parallel screw thread 51, and the clearance side convex flank 24c has no step formed in its root portion with the clearance side flank 5c of the screw thread 5. Moreover, a corner C2 between the clearance side convex flank 24c and the convex crest 24a is in abutment with a clearance side flank 201c of the internal screw 201, and the corner C2 is rounded.

FIG. 7B is a partial perspective view looking obliquely at a convex portion end face 24d in the screw driving direction of the convex portion 24.

Similar to the above-mentioned embodiment, the convex portion end face 24d inclines in a direction in which a root side portion thereof protrudes forward in the screw driving direction toward the screw thread crest 5a. That is, the convex portion end face 24d at the screw driving side is a slope or inclined surface which rises up from an end edge at the side of the screw thread crest 5a toward an end edge at the side of the convex crest 24a with the height of the screw thread gradually increasing in a direction W2 opposite to the screw driving direction of the screw thread 5, and leads to the crest 24a of the convex portion 24.

The convex portion end face 24d at the screw driving side is provided with a crest region 24d1 of a trapezoidal shape extending from the convex crest 24a to its end edge at the side of the screw thread crest, and a pressure side flank end region 24d2 and a clearance side flank end region 24d3 branching from the crest region 24d1 and extending in an inverted V shape along the end edges in the screw driving direction of the pressure side convex flank 24b and the clearance side convex flank 24c.

The flank end region 24d2 at the side of the pressure side convex flank 24b is configured to have a first region 24d2a extending from the crest region 24d1 to the first point of inflexion P21, and a second region 24d2b of a triangular shape having the second point of inflexion P22 as a vertex, and is slightly larger than in the case of the first modification.

Operation of the Second Modification (In the Case of Using the External Screw Member as a Bolt for Removing Foreign Matter)

In cases where the external screw member is used as a bolt for removing foreign matter, as illustrated in FIG. 6A, in the case of this second modification, too, only a corner formed by the convex crest 24a, the pressure side convex flank 24b and the clearance side convex flank 24c is in contact with the internal screw 201, so that contact pressure can act intensively on foreign matter, so that the foreign matter such as painting, coating, sputter, etc., can be removed in an efficient manner.

In addition, although it is configured such that the corner of the convex portion 24 at the side of the convex crest 24a is in partial contact with the internal screw 201, the foreign matter can be peeled or exfoliated in a wider area than a partial contact area due to the eccentricity (i.e., eccentric movement) of the bolt or external screw member relative to the internal screw member. Moreover, by providing the convex portion 24 on each of the parallel screw thread 51 and the tapered screw thread 52, the peeling or exfoliation of the foreign matter can be carried out in a much wider area extending from the vicinity of the inside diameter portion of the internal screw to the convex crest of the parallel screw thread 51.

Moreover, the maximum diameter of each convex portion 24 gradually increases from the tapered screw thread 52, and each convex portion 24 is screw driven into the internal screw member, while being in abutment with the inside diameter side portions of the pressure side flank and the clearance side flank of the internal screw, so that foreign matter will be gradually scraped from the inside diameter side of the internal screw, and finally, each convex portion 24 will come into abutment with the inner deep portions of the internal screw, thus scraping off foreign matter therefrom. Accordingly, even with the partial contact, it is possible to scrape off the foreign matter such as painting, coating, etc., adhered to the pressure side flank 201b and the clearance side flank 201c, from the inside diameter side to the thread bottom side in a uniform manner.

In particular, powdery peeled materials at the time of exfoliating foreign matter such as paint films, sputter, etc., adhered to the internal screw 201 can be made to stay not only in the parallel screw thread 51 with no convex portion between the adjacent convex portions 24 adjoining each other in a lead direction, but also in the vicinity of the concavely recessed first point of inflexion P21 between the corner C1 of the convex crest 24a and the pressure side convex flank 24b in abutment with the pressure side flank 201b of the internal screw 201, and the second point of inflexion P22, so that a staying space for chips and the peeled materials is increased, and a preventive effect to prevent biting or jamming of the foreign matter can be enhanced to a further extent.

FIG. 6B illustrates a state where the convex portion 24 has passed through the internal screw 201, with foreign matter such as painting, coating, etc., and impurities in the internal screw 201 removed. From this state, the following parallel screw thread 51 comes into engagement with the internal screw 201, so that the external screw member is finally tightened and fixed to the internal screw member.

(In the Case of Using the External Screw Member as a Self-Tapping Screw)

FIGS. 6C and 6D illustrate a state where the external screw member is used as a self-tapping screw.

As shown in FIG. 6C, the cross sectional shape of the root portion of the internal screw is finally processed or formed by following the cross sectional shape of the convex portion 24 formed in parallel screw thread 51, and as illustrated in FIG. 6D, the following parallel screw thread 51 advances into the internal screw 102 thus formed, and is finally tightened and fixed thereto.

With the convex portion 24 of this mode or modification, too, at the time of machining the internal screw, as shown in FIG. 7B, the convex portion end face 24d in the screw driving direction forms an inclined plane which rises up from an end edge of the screw thread 5 at the crest side toward a crest side end edge of the convex portion 24 in the opposite direction W2 to the screw driving direction of the screw thread 5. With such a configuration, the prepared hole 101 can be plastically deformed in a smooth manner thereby to form the internal screw.

In this example, the pressure side flank end region 24d2 of the convex portion end face 24d is configured to have a crest region 24d2a extending from the crest 24a to the first point of inflexion P21, and a second region 24d2b having the second point of inflexion P22 as a vertex. With this configuration, a contact area increases a bit more than in the example of FIGS. 5A through 5D, but there may be no contact depending on the diameter of the prepared hole, and an increase in screw driving torque can be suppressed. In addition, an amount of chips to be generated can be more decreased, and at the same time, the screw driving torque can be made smaller.

Moreover, the internal screw 102 formed according to the cross sectional shape of the convex portion 24 is configured such that a pressure side flank 102a has a crest side flank portion 102a1 corresponding to the crest side flank portion 24b1 and a root side flank portion 102a2 corresponding to the intermediate flank portion 24b3, and a point of inflexion Q2 is formed at a boundary between these two flank portions 102a1. 102a2.

In FIG. 8, there is illustrated a schematic drawing for explaining a preferable range of each of the point of inflexion P1, the first point of inflexion P21 and the second point of inflexion P22.

It is preferable that a position X1 of each of the point of inflexion P1 and the first point of inflexion P21 be set to a range which is 35%-55% of a thread height X0 of each convex portion 4, 14 and 24 from each convex crest 4a, 14a and 24a (i.e., a height from the crest of each convex portion 4, 14 and 24 to the root portion of the screw thread).

When the position of each of the point of inflexion P1 and the first point of inflexion P21 is too close to the convex crest 4a, 14a and 24a, a contact range in which each convex portion 4, 14, 24 is in contact with foreign matter such as painting, coating, etc., becomes narrow, and the peeling efficiency of peeling off the foreign matter becomes worse. On the other hand, when the position of each of the point of inflexion P1 and the first point of inflexion P21 is far from the convex crest 4a, 14a and 24a and close to the root portion, the peeling efficiency tends to be improved, but screw driving torque tends to become large. When setting the position of each of the point of inflexion P1 and the first point of inflexion P21 to about 35%-55% of the thread height of each convex portion 14, the peeling efficiency can be improved, and an increase in screw driving torque can also be suppressed.

A position X2 of the second point of inflexion P22 is preferably set to a range of 70%-85% of the thread height X0 of the convex portion 14 from the crest of the convex portion 14.

When the position of the second point of inflexion P22 is close to the root portion, a space between the first point of inflexion P21 and the second point of inflexion P22 is opened wide, so that the effect of making the exfoliated foreign matter stay there becomes small. On the other hand, when the position of the second point of inflexion P22 is close to the crest, the space in which the foreign matter is made to stay is formed, but the space becomes narrow. When setting the second point of inflexion P22 in the range of 70%-85% of the thread height X0 of the convex portion 14, chips generated at the time of forming the internal screw and painting or coating materials exfoliated from the inner periphery of a nut can be made to stay in a space between the first point of inflexion P21 and the second point of inflexion P22, and further in a range from the second point of inflexion P22 to the thread bottom or root.

Here, note that in the examples of the modifications in FIGS. 5A through 5D, FIGS. 6A through 6D and FIGS. 7A and 7B, the points of inflexion are arranged in the pressure side convex flank, and the clearance side convex flank is configured to have a single angle, but points of inflexion may also be formed in the clearance side convex flank, and may be arranged in symmetry with respect to the pressure side convex flank.

Although in the above-mentioned embodiments, there have been explained a case where the external screw member is used as a self-tapping screw, and a case where the external screw member is used as a bolt for removing foreign matter, but one screw member can also be used for both purposes or can also be used only for either one purpose, i.e., exclusively used as a self-tapping screw or a foreign matter removing bolt.

What is claimed is:

1. A external screw member comprising a head, and a shank extending linearly from said head, said shank having a parallel threaded portion and a tapered threaded portion formed in order from said head toward a tip end, a screw thread being continuously formed on said parallel threaded portion and said tapered threaded portion at the same pitch, and said screw thread in said tapered threaded portion being configured in a form in which the height of a crest thereof becomes gradually smaller, wherein
a convex portion protruding more radially outward than the crest of said screw thread is formed in at least one of said parallel threaded portion and said tapered threaded portion over said tapered threaded portion and said parallel threaded portion;
a screw driving side end face of said convex portion is configured to form an inclined plane which gradually rises from a root position of said end face at the side of the crest of said screw thread toward a crest of said convex portion in a direction opposite to a screw driving direction of said screw thread to reach the crest of said convex portion; and
said convex portion is configured such that one or more convex portions are arranged in a circumferential direction, and in each convex portion, a circumferential length of the crest thereof which is a maximum diameter of said convex portion is formed in the range of 2.5%-5.0% of a circumference through which the crest of said convex portion of said screw thread passes.

2. The external screw member as claimed in claim 1, wherein assuming that an angle (θ) of inclination of the screw driving side end face of said convex portion is an angle which is formed, in a projection image of said convex portion projected in an axial direction to a projection plane axially perpendicular to a central axis of said shank, by an inclined line connecting between an end edge of a contour of said end face at the side of the crest of said convex portion and an end edge of the contour at the side of the crest of said screw thread, and a reference line perpendicular to a line connecting between a middle point in a circumferential direction of a contour of the crest of said convex portion and a central axis of a screw shaft, said angle of inclination is set in the range of from 10 degrees inclusive to 60 degrees inclusive.

3. The external screw member as claimed in claim 1, wherein said convex portion is configured such that one through ten convex portions are arranged on the circumference at an equal interval.

4. The external screw member as claimed in 3, wherein a pressure side flank of the screw thread having said convex portion is configured such that it is composed of at least two or more flank portions with different flank angles, and that it has one or more points of inflexion which each become a boundary of each of said flank portions.

5. The external screw member as claimed in claim 2, wherein said convex portion is configured such that one through ten convex portions are arranged on the circumference at an equal interval.

6. The external screw member as claimed in of claim 2, wherein a pressure side flank of the screw thread having said convex portion is configured such that it is composed of at least two or more flank portions with different flank angles, and that it has one or more points of inflexion which each become a boundary of each of said flank portions.

7. The external screw member as claimed in claim 3, wherein a pressure side flank of the screw thread having said convex portion is configured such that it is composed of at least two or more flank portions with different flank angles, and that it has one or more points of inflexion which each become a boundary of each of said flank portions.

8. The external screw member as claimed in claim 5, wherein a pressure side flank of the screw thread having said convex portion is configured such that it is composed of at least two or more flank portions with different flank angles, and that it has one or more points of inflexion which each become a boundary of each of said flank portions.

9. A external screw member comprising a head, and a shank extending linearly from said head, said shank having a parallel threaded portion and a tapered threaded portion formed in order from said head toward a tip end, a screw thread being continuously formed on said parallel threaded portion and said tapered threaded portion at the same pitch, and said screw thread in said tapered threaded portion being configured in a form in which the height of a crest thereof becomes gradually smaller, wherein
a convex portion protruding more radially outward than the crest of said screw thread is formed in at least one of said parallel threaded portion and said tapered threaded portion over said tapered threaded portion and said parallel threaded portion;
a screw driving side end face of said convex portion is configured to form an inclined plane which gradually rises from a root position of said end face at the side of the crest of said screw thread toward a crest of said convex portion in a direction opposite to a screw driving direction of said screw thread to reach the crest of said convex portion; and
a pressure side flank of the screw thread having said convex portion is configured such that it is composed of at least two or more flank portions with different flank angles, and that it has one or more points of inflexion which each become a boundary of each of said flank portions, and that a flank angle of a root side flank portion adjacent to a first point of inflexion is larger than a flank angle of a flank portion at the side of the crest, with said first point of inflexion located at the side closest to the crest as a border;
the flank portion at the side of the crest inclines linearly from the crest of the convex portion; and
a corner is provided between the crest side flank portion and a convex crest.

10. An external screw member comprising a head, and a shank extending linearly from said head, said shank having a parallel threaded portion and a tapered threaded portion formed in order from said head toward a tip end, a screw thread being continuously formed on said parallel threaded portion and said tapered threaded portion at the same pitch, and said screw thread in said tapered threaded portion being configured in a form in which the height of a crest thereof becomes gradually smaller, wherein
- a convex portion protruding more radially outward than the crest of said screw thread is formed in at least one of said parallel threaded portion and said tapered threaded portion over said tapered threaded portion and said parallel threaded portion;
- a screw driving side end face of said convex portion is configured to form an inclined plane which gradually rises from a root position of said end face at the side of the crest of said screw thread toward a crest of said convex portion in a direction opposite to a screw driving direction of said screw thread to reach the crest of said convex portion; and
- a pressure side flank of the screw thread having said convex portion is configured such that it is composed of at least two or more flank portions with different flank angles, and that it has one or more points of inflexion which each become a boundary of each of said flank portions, and that a flank angle of a root side flank portion adjacent to a first point of inflexion is larger than a flank angle of a flank portion at the side of the crest, with said first point of inflexion located at the side closest to the crest as a border;

wherein a second point of inflexion is formed closer to a root side of an external thread than said first point of inflexion, and is formed of an intermediate flank portion having an angle still larger than that of said root side flank portion, and the flank angle of said intermediate flank portion is set to be larger than the flank angle of the root side flank portion, and the flank angle of said root side flank portion is set to be equal to or more than a flank angle of a crest side flank portion.

* * * * *